US011604737B1

(12) United States Patent
Greathouse et al.

(10) Patent No.: US 11,604,737 B1
(45) Date of Patent: Mar. 14, 2023

(54) DYNAMIC MODIFICATION OF COHERENT ATOMIC MEMORY OPERATIONS

(71) Applicant: ADVANCED MICRO DEVICES, INC., Santa Clara, CA (US)

(72) Inventors: Joseph L. Greathouse, Austin, TX (US); Steven Tony Tye, Boxborough, MA (US); Mark Fowler, Boxborough, MA (US); Milind N. Nemlekar, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/516,860

(22) Filed: Nov. 2, 2021

(51) Int. Cl.
*G06F 12/00* (2006.01)
*G06F 12/0891* (2016.01)
*G06F 12/0831* (2016.01)
*G06F 9/448* (2018.01)
*G06F 9/30* (2018.01)
*G06F 12/0888* (2016.01)

(52) U.S. Cl.
CPC ...... *G06F 12/0891* (2013.01); *G06F 9/30047* (2013.01); *G06F 9/4498* (2018.02); *G06F 12/0831* (2013.01); *G06F 12/0888* (2013.01)

(58) Field of Classification Search
CPC ............ G06F 12/0891; G06F 12/0831; G06F 12/0888; G06F 9/4498; G06F 9/30047
See application file for complete search history.

(56) References Cited

U.S. PATENT DOCUMENTS

2015/0347196 A1* 12/2015 Truong .................. G06F 9/528
718/107

OTHER PUBLICATIONS

P. Nair, V. Sridharan, M. Qureshi, "XED: Exposing On-Die Error Detection Information for Strong Memory Reliability", ISCA 2016.
H. Jeon, G. Loh, M. Annavaram, "Efficient RAS Support for 3D Die-Stacked DRAM", IEEE International Test Conference, 2014.
S. Gurumurthi, K. Lee, M. Jang, V. Sridharan, A. Nygren, Y. Ryu, K. Sohn, T. Kim, and H. Chung, HBM3 Ras: Enhancing Resilience at Scale, IEEE Computer Architecture Letters, 2021.
High Bandwidth Memory DRAM (HBM3) Standard, JESD238, Jedec Solid State Technology Association, Jan. 2022.

* cited by examiner

*Primary Examiner* — Gurtej Bansal (57) ABSTRACT

A processing device determines a scope indicating at least a portion of the processing system and target data from atomic memory operation to be performed. Based on the scope, the processing device determines one or more hardware parameters for at least a portion of the processing system. The processing device then compares the hardware parameters to the scope and target data to determine one or more corrections. The processing device then provides the scope, target data, hardware parameters, and corrections to a plurality of hardware lookup tables. The hardware lookup tables are configured to receive the scope, target data, hardware parameters, and corrections as inputs and output values indicating one or more coherency actions and one or more orderings. The processing device then executes one or more of the indicated coherency actions and the atomic memory operation based on the indicated ordering.

20 Claims, 4 Drawing Sheets

DYNAMIC MODIFICATION OF COHERENT ATOMIC MEMORY OPERATIONS

BACKGROUND

Within processing systems including multiple processing devices, atomic memory operations are useful in some situations to reduce errors or provide additional memory security. To enforce the atomicity of an atomic memory operation, coherency across a scope indicated by the atomic memory operation is maintained using certain coherency operations performed within the processing system. Such coherency operations are determined by the compiler which does not provide the flexibility to update the coherency operations as hardware conditions change. Based on this, atomic memory operations determined by the compiler may specify scopes that are device-specific, further limiting their flexibility. The device-specific nature of the scope of the atomic memory operations leads to increased system resources as atomic memory operations must be compiled for each hardware configuration and a new atomic memory operation must be compiled each time the hardware configuration changes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Techniques and systems described herein address providing device-agnostic atomic memory operations in a processing system through determining coherency actions at one or more processing devices of the processing system. Such coherency actions include coherency and fencing operations that help ensure the atomicity and coherency of the atomic memory operations when they are performed by the processing system. To determine the coherency actions, a processing device determines a scope indicating at least a portion of the processing system and target data from an atomic memory operation to be performed. Based on the scope, the processing device determines one or more hardware parameters for at least a portion of the processing system. For example, one or more operating modes of processing devices within a portion of the processing system identified by the scope are determined. The processing device then compares the hardware parameters to the scope and target data to determine one or more corrections. For example, the processing device compares the hardware parameters to the scope and target data to determine if the scope or target data need to be updated. In this way, the scope, target data, and resulting coherency actions can be dynamically updated during a runtime of the processor based on the hardware parameters.

The processing device then provides the scope, target data, hardware parameters, and corrections to a plurality of hardware lookup tables. The hardware lookup tables are configured to receive the scope, target data, hardware parameters, and corrections as inputs and output values indicating one or more coherency actions and one or more orderings for performing the indicated coherency actions and the atomic memory operations. Based on the orderings indicated the hardware lookup tables, the processing device executes one or more of the indicated coherency actions and atomic memory operations. In this way, the atomic memory operations are device-agnostic as the coherency actions are determined at the processing device rather than a compiler. As such, the generation of the atomic memory operations requires fewer system resources, increasing the efficiency of the processing system. Additionally, the atomic memory operations are more flexible as they can be run on multiple devices.

Figure 1:
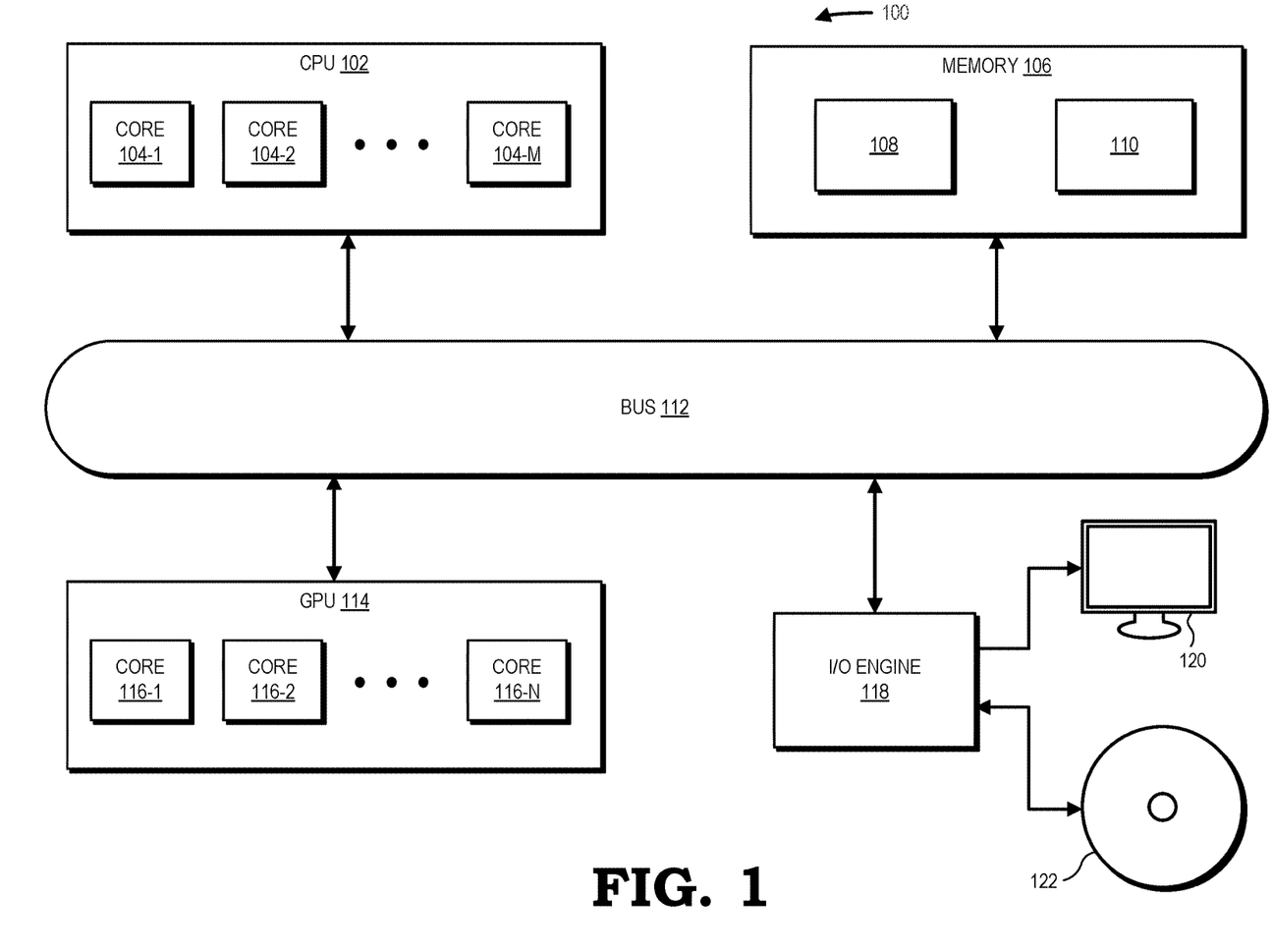
FIG. 1 is a block diagram of a processing system for hardware-agnostic atomicity, in accordance with some embodiments.

FIG. 1 is a block diagram of a processing system 100 for hardware-agnostic atomicity, according to some embodiments. The processing system 100 includes or has access to a memory 106 or other storage component implemented using a non-transitory computer-readable medium, for example, a dynamic random access memory (DRAM). However, in embodiments, the memory 106 is implemented using other types of memory including, for example, static random access memory (SRAM), nonvolatile RAM, and the like. According to embodiments, the memory 106 includes an external memory implemented external to the processing units implemented in the processing system 100. The processing system 100 also includes a bus 112 to support communication between entities implemented in the processing system 100, such as the memory 106. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like), scalar processors, serial processors, or any combination thereof. FIG. 1 illustrates an example of a parallel processor and in particular a graphics processing unit (GPU) 114, in accordance with some embodiments. The GPU 114 renders images for presentation on a display 120. For example, the GPU 114 renders objects to produce values of pixels that are provided to the display 120, which uses the pixel values to display an image that represents the rendered objects. The GPU 114 implements a plurality of processor cores 116-1 to 116-N that execute instructions concurrently or in parallel. According to embodiments, one or more processor cores 116 operate as SIMD units that perform the same operation on different data sets. Though in the example embodiment illustrated in FIG. 1, three cores (116-1, 116-2, 116-N) are presented representing an N number of cores, the number of processor cores 116 implemented in the GPU 114 is a matter of design choice. As such, in other embodiments, the GPU 114 can include any number of cores 116. Some embodiments of the GPU 114 are used for general-purpose computing. The GPU 114 executes instructions such as program code 108 stored in the memory 106 and the GPU 114 stores information in the memory 106 such as the results of the executed instructions.

The processing system 100 also includes a central processing unit (CPU) 102 that is connected to the bus 112 and therefore communicates with the GPU 114 and the memory 106 via the bus 112. The CPU 102 implements a plurality of processor cores 104-1 to 104-N that execute instructions concurrently or in parallel. In embodiments, one or more of the processor cores 104 operate as SIMD units that perform the same operation on different data sets. Though in the example embodiment illustrated in FIG. 1, three cores (104-1, 104-2, 104-M) are presented representing an M number of cores, the number of processor cores 104 implemented in the CPU 102 is a matter of design choice. As such, in other embodiments, the CPU 102 can include any number of cores 104. In some embodiments, the CPU 102 and GPU 114 have an equal number of cores 104, 116 while in other embodiments, the CPU 102 and GPU 114 have a different number of cores 104, 116. The processor cores 104 execute instructions such as program code 110 stored in the memory 106 and the CPU 102 stores information in the memory 106 such as the results of the executed instructions. The CPU 102 is also able to initiate graphics processing by issuing draw calls to the GPU 114. In embodiments, the CPU 102 implements multiple processor cores (not shown in FIG. 1 in the interest of clarity) that execute instructions concurrently or in parallel.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the GPU 114, or the CPU 102. In the illustrated embodiment, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the GPU 114 or the CPU 102.

According to embodiments, the GPU 114, CPU 102, or both can receive, perform, create, execute, or any combination thereof instructions causing one or more atomic memory operations to be performed, for example, via bus 112. That is to say, GPU 114, CPU 102, or both can receive, perform, create, execute, or any combination thereof instructions requiring, requesting, or indicating one or more atomic memory operations to be performed. For example, one or more cores of GPU 114, CPU 102, or both create instructions that require one or more atomic memory operations to be performed. An "atomic memory operation," as used herein, includes signals indicating that one or more lockless, concurrent operations are to be executed on target data within the system 100. Such operations include, for example, atomic stores, atomic exchanges, atomic loads, and atomic fetches, to name a few. In embodiments, each atomic memory operation identifies one or more scopes. A "scope," as used herein, includes parameters indicating two or more heterogeneous structures across which the atomic memory operation is atomic (i.e., coherent with). In other words, a scope includes parameters indicating one or more systems, portions of a system, devices (e.g., CPUs, GPUs, accelerated processing units (APUs), field-programmable gate arrays (FPGAs)), portions of a device (e.g., cores), or memory structures (e.g., cache hierarchies, caches, data fabrics) across which the atomic memory operation will be coherent. For example, a scope includes parameters indicating cores of a CPU and cores of a GPU across which an atomic memory operation will be coherent. As another example, a scope includes parameters indicating a CPU and a GPU across which an atomic memory operation will be coherent. In embodiments, the target data (e.g., location, cache, data content) identified by the atomic memory operation includes the location (e.g., memory, cache), data type, content, or any combination thereof of the target data.

In embodiments, in response to causing an atomic memory operation, the GPU 114, CPU 102, or both are configured to determine one or more coherency actions based on the atomic memory operations. A "coherency action," as used herein, includes one or more operations to be performed by the GPU 114, CPU 102, or both that are necessary for, assist in, or aid in ensuring the atomic memory operation is coherent within the scope identified by the atomic memory operation. Such operations include, for example, updating state machines, flushing one or more memory structures (e.g., caches, data fabrics), invalidating one or more memory structures, bypassing one or more memory structures, fencing one or more memory structures, and fencing one or more threads, to name a few. According to embodiments, the GPU 114, CPU 102, or both are configured to determine one or more coherency actions based on the scope identified by an atomic memory operation, the target data identified by an atomic memory operation, or both. In embodiments, the GPU 114, CPU 102, or both determine coherency actions further based on one or more hardware parameters of systems, portions of a system, devices, portions of a device, memory structures, or any combination thereof, indicated in the scope of an atomic memory operation. Such hardware parameters include, for example, operating modes (e.g., performance mode, power-saving mode, two-core mode, four-core mode, split mode, thread mode), addresses, connectivity (e.g., how devices are connected, number of ports, available ports, communication protocols), device architecture (e.g., number of cores), device hierarchies, memory locations, and memory architectures, to name a few. According to embodiments, the GPU 114, CPU 102, or both determine one or more corrections based on the scope identified by the atomic memory operation, the target data identified by the atomic memory operation, and the hardware parameters. For example, the GPU 114, CPU 102, or both determine one or more corrections based on one or more discrepancies or incongruencies between the scope identified by the atomic memory operation, the target data identified by the atomic memory operation, and the hardware parameters, for example, discrepancies or incongruencies between operating modes, devices, memory locations, and connectivity. As an example, GPU 114, CPU 102, or both determine an incongruency based on a scope of an atomic memory operation that identifies a device having eight cores and a hardware parameter indicating that the device is operating as two four-core systems according to its operating mode. From these determined discrepancies and incongruencies the GPU 114, CPU 102, or both determine one or more corrections to the scope identified by the atomic memory operation, the target data identified by the atomic memory operation, the hardware parameters, or any combination thereof.

By determining one or more coherency actions based on the scope identified in an atomic memory operation, the target data identified in an atomic memory operation, determined hardware parameters, determined corrections, or any combination thereof, atomic memory operations within system 100 are device agnostic. That is to say, atomic memory operations within system 100 can be executed by one or more devices within system 100 each having different hardware hierarchies, connectivities, architectures, operating modes, or any combination thereof. Because hardware parameters, coherency actions, and corrections are determined at the hardware, the atomic memory operations in the system 100 are not required to include this information, making the atomic memory operations device agnostic.

Figure 2:
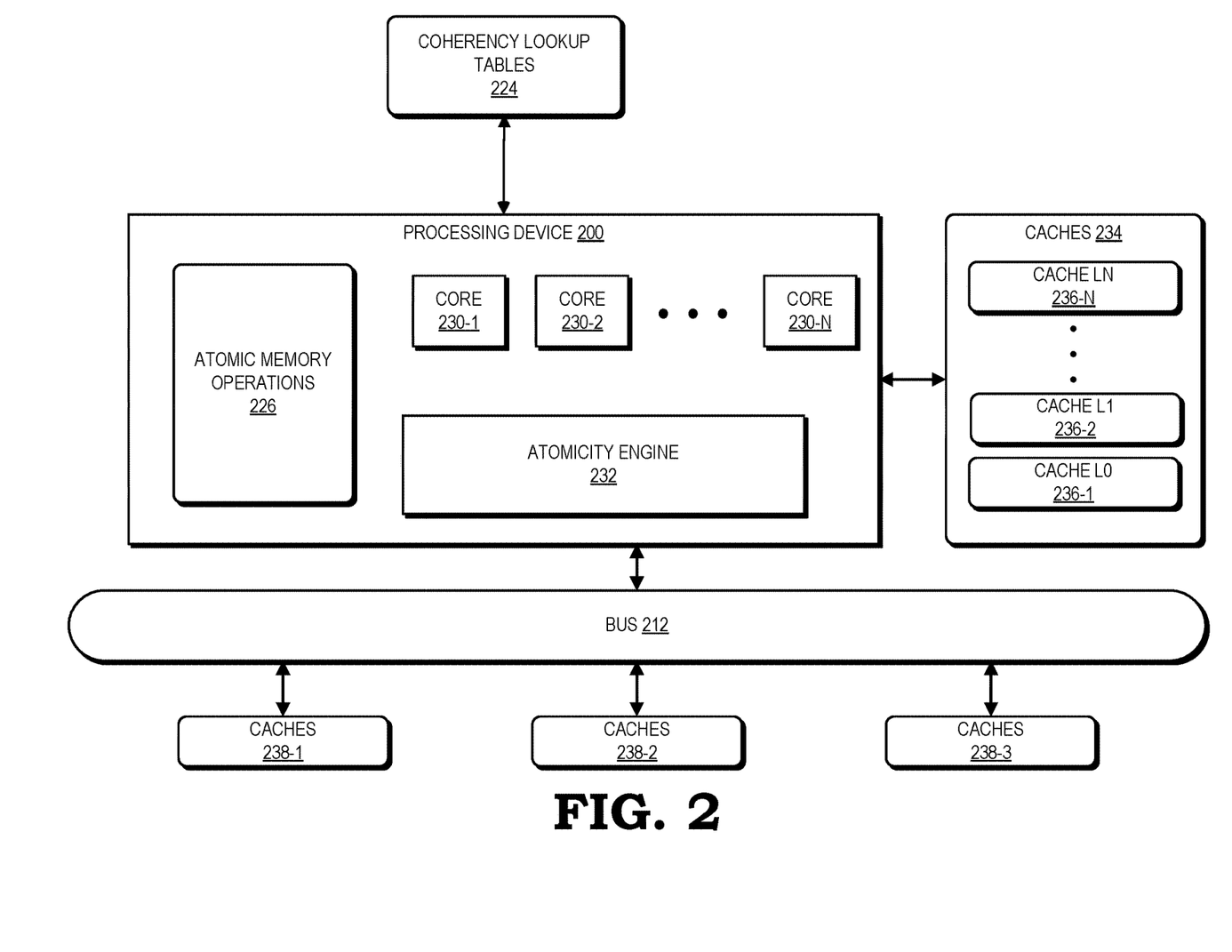
FIG. 2 is a block diagram of a processing device configured to generate one or more coherency actions based on atomic memory operations to be performed, in accordance with some embodiments.

Referring now to FIG. 2, a block diagram of a processing device 200 configured to generate one or more coherency actions based on atomic memory operations 226 to be performed is presented. In other words, processing device 200 performs, creates, receives, or executes, instructions that require, request, or indicate one or more atomic memory operations 226 to be performed. In embodiments, the processing device 200 implements aspects of processing system 100 as described in FIG. 1. For example, processing device 200 may be similar or the same as CPU 102, GPU 114, or both as described in FIG. 1. Processing device 200 includes or is connected to caches 234 including caches arranged in cache levels L0-LN 236 in a cache hierarchy. Though the example embodiment illustrated in FIG. 2 presents three levels of caches (L0 236-1, L1 236-2, LN 236-N) representing an N number of cache levels, in other embodiments, any number of cache levels can be used. Additionally, processing device 200 is connected by one or more busses to one or more other caches 238 each including caches arranged in multiple levels. Though the example embodiment illustrated in FIG. 2 presents three other caches (238-1, 238-2, 238-3) connected to processing device 200 by one bus 212, in other embodiments processing device 200 can be connected to any number of other caches 238 by any number of busses. In embodiments, processing device 200 is connected to one or more other processing devices by one or more busses, for example, by bus 212.

According to embodiments, processing device 200 includes hardware and software to determine and perform one or more coherency actions in response to receiving, performing, creating, executing, or any combination thereof, instructions causing one or more atomic memory operations 226 to be performed. In embodiments, processing device 200 includes atomicity engine 232 that includes hardware and software configured to determine one or more hardware parameters, corrections, and coherency actions in response to processing device 200 causing one or more atomic memory operations 226. According to embodiments, each atomic memory operation 226 to be performed identifies one or more scopes and target data. That is to say, each atomic memory operation 226 identifies the two or more systems, portions of a system, devices portions of a device, or memory structures across which the atomic memory operation 226 and the identified target data will be coherent. According to embodiments, one or more cores 230 of processing device 200 each include a respective atomicity engine 232.

In embodiments, based on the atomic memory operations 226 to be performed, atomicity engine 232 determines one or more hardware parameters. For example, atomicity engine 232 determines hardware parameters for one or more devices indicated in the scope of an atomic memory operation. According to embodiments, atomicity engine 232 performs one or more discovery operations related to the portions of a system, devices, memories, memory hierarchies, or any combination thereof, indicated in the scope of the atomic memory operation. The discovery operation includes data requesting the hardware parameters of one or more portions of a system, devices, memories, memory hierarchies, or any combination thereof, connected to processing device 200. For example, the discovery operation includes data requesting the operating modes, connectivity, numbers of cores, device architecture, and device hierarchies of devices identified in the scope of an atomic memory operation and connected to processing device 200. In embodiments, one or more hardware parameters of portions of a system, devices, memories, memory hierarchies, or any combination thereof, connected to processing device 200 are stored in a memory 206, similar to or the same as memory 106, for example, hardware parameters received from a previous discovery operations.

According to embodiments, based on one or more scopes identified in one or more atomic memory operations 226 to be performed, target data identified in one or more received atomic memory operations 226, and determined hardware parameters, atomicity engine 232 is configured to determine one or more coherency actions. In embodiments, atomicity engine 232 provides one or more scopes identified in one or more atomic memory operations 226 to be performed, target data identified in one or more atomic memory operations 226 to be performed, determined hardware parameters, or any combination thereof to one or more coherency lookup tables 224. Coherency lookup tables (LUTs) 224 include one or more software or hardware LUTs that include one or more arrays configured to receive one or more scopes, target data (e.g., location, cache, data content), or hardware parameters as inputs and output one or more values. For example, coherency LUTs 224 include one or more hardware LUTs comprising an array of multiplexers configured to receive one or more scopes, target data, or hardware parameters as inputs and output a value. According to embodiments, coherency LUTs 224 comprise one or more state machines configured to receive one or more scopes, target data (e.g., location, cache, data content), or hardware parameters as inputs and output one or more values. For example, for a processing device 200 where hardware parameters are fixed, LUTs 224 include one or more tables hardcoded as logic, for example, as one or more state machines. In embodiments, values output by coherency LUTs 224 identify one or more coherency actions. That is to say, the values identify one or more operations that are necessary for, assist in, or aid in ensuring an atomic memory operation on the target data input to the coherency LUTs 224 is coherent within the scope input to the coherency LUTs 224 for hardware having the hardware parameters input to the coherency LUTs 224. According to embodiments, values output by the coherency LUTs 224 are provided as inputs to one or more other LUTs or operations configured to output values indicating one or more coherency actions. In embodiments, LUTs 224 are configured to receive one or more scopes, target data, or hardware parameters as inputs and output one or more orderings. An "ordering," as used herein, indicates an order of execution for one or more portions of a coherency action relative to one or more portions of an atomic memory operation to be performed. That is to say, in what order the portions of the coherency action and atomic memory operations are to be performed. For example, an ordering indicates whether a first portion of a coherency action is to be performed before or after a at least a portion of an atomic memory operation.

In embodiments, the coherency actions identified by coherency LUTs 224 include operations to perform on one or more devices, memory structures, or both connected to processing device 200, for example, flushing one or more memory structures (e.g., caches, data fabrics), invalidating one or more memory structures, bypassing one or more memory structures, fencing one or more memory structures, and fencing one or more threads, to name a few. For example, a coherency operation identified by coherency LUTs 224 includes a flush operation so as to flush a cache from caches 238-2 connected to processing device 200 by bus 212. As another example, a coherency operation identified by coherency LUTs 224 includes a bypassing operation so as to bypass cache level L1 236-1 of caches 234. According to embodiments, the coherency actions identified by coherency LUTs 224 include machine instructions, state machine data, or both. Atomicity engine 232 is configured to provide these coherency actions to microcode configured to translate the coherency actions to one or more circuit-level operations. In embodiments, processing device 200 includes a high-speed memory (not shown for clarity) configured to store the microcode. In embodiments, processing device 200 includes cores 230 configured to execute one or more operations or microcode associated with one or more coherency actions. Though the example embodiments of FIG. 2 illustrates processing device 200 with three cores (230-1, 230-2, 230-N) representing an N number of cores, in other embodiments, processing device 200 may have any number of cores.

According to embodiments, atomicity engine 232 determines one or more corrections based on one or more discrepancies or incongruencies between the scope identified by the atomic memory operation, the target data identified by the atomic memory operation, and the hardware parameters such as, for example, discrepancies or incongruencies between device operating modes, device architectures, device connectivity, memory locations, and memory architectures, to name a few. As an example, atomicity engine 232 determines an incongruency based on a scope of an atomic memory operation that identifies a device having eight cores and a hardware parameter indicating that the device is operating as two four-core systems according to its operating mode. As another example, atomicity engine 232 determines a discrepancy based on a target data identified in an atomic memory operation at a first location and a hardware parameter indicating the target data is at a second location. In embodiments, atomicity engine 232 is configured to determine a correction based on the identified discrepancies and incongruencies. A "correction," as used herein, includes data representing updated parameters, modifications, or inputs necessary for, assisting in, or aiding in the mitigation of the identified discrepancies and incongruencies. For example, based on an incongruency of a scope that identifies a device as having eight cores and a hardware parameter indicating that the device is operating as two four-core systems, atomicity engine 232 determines an update to the scope to indicate a device operating as two-four core systems rather than one device. As another example, based on a discrepancy of a target data identified in an atomic memory operation at a first location and a hardware parameter indicating the target data at a second location, atomicity engine 232 determines an update to the target data to indicate the target data is at the second location. In embodiments, atomicity engine 232 provides data representing the determined discrepancies and incongruencies as inputs to coherency LUTs 224 further configured to output data representing one or more corrections. By determining one or more corrections based on the determined discrepancies and incongruencies, atomicity engine 232 can update the inputs provided to coherency LUTs 224 at run time. As such, the resulting coherency actions are updated at run time so that the determination of coherency actions can occur during runtime rather than during a basic input/output system (BIOS).

In embodiments, atomicity engine 232 is further configured to determine one or more corrections further based on system performance. For example, based on one or more determined hardware parameters, scopes, and target data, atomicity engine 232 determines an impact of one or more atomic memory operations 226 on the processing speed, power usage, delay times, queue lengths, or any combination thereof of system 100, to name a few. Based on the impact of the atomic memory operation 226 and the determined hardware parameters, atomicity engine 232 determines one or more corrections to mitigate the impact of the atomic memory operation 226 on the processing speed, efficiency, power usage, delay times, queue lengths, or any combination thereof of system 100. For example, atomicity engine 232 compares the impact of the atomic memory operation to one or more thresholds representing threshold values for the processing speed, power usage, delay times, queue lengths, or any combination thereof of system 100. As another example, atomicity engine 232 provide values the impact to one or more coherency LUTs 224 configured to output values representing one or more corrections. As yet another example, processing device 200 determines a power usage based on a hardware parameter and an atomic memory operation to be performed. Processing device 200 then identifies a correction comprising a modification to a coherency action based on the power usage and modifies the coherency action based on the correction.

Figure 3:
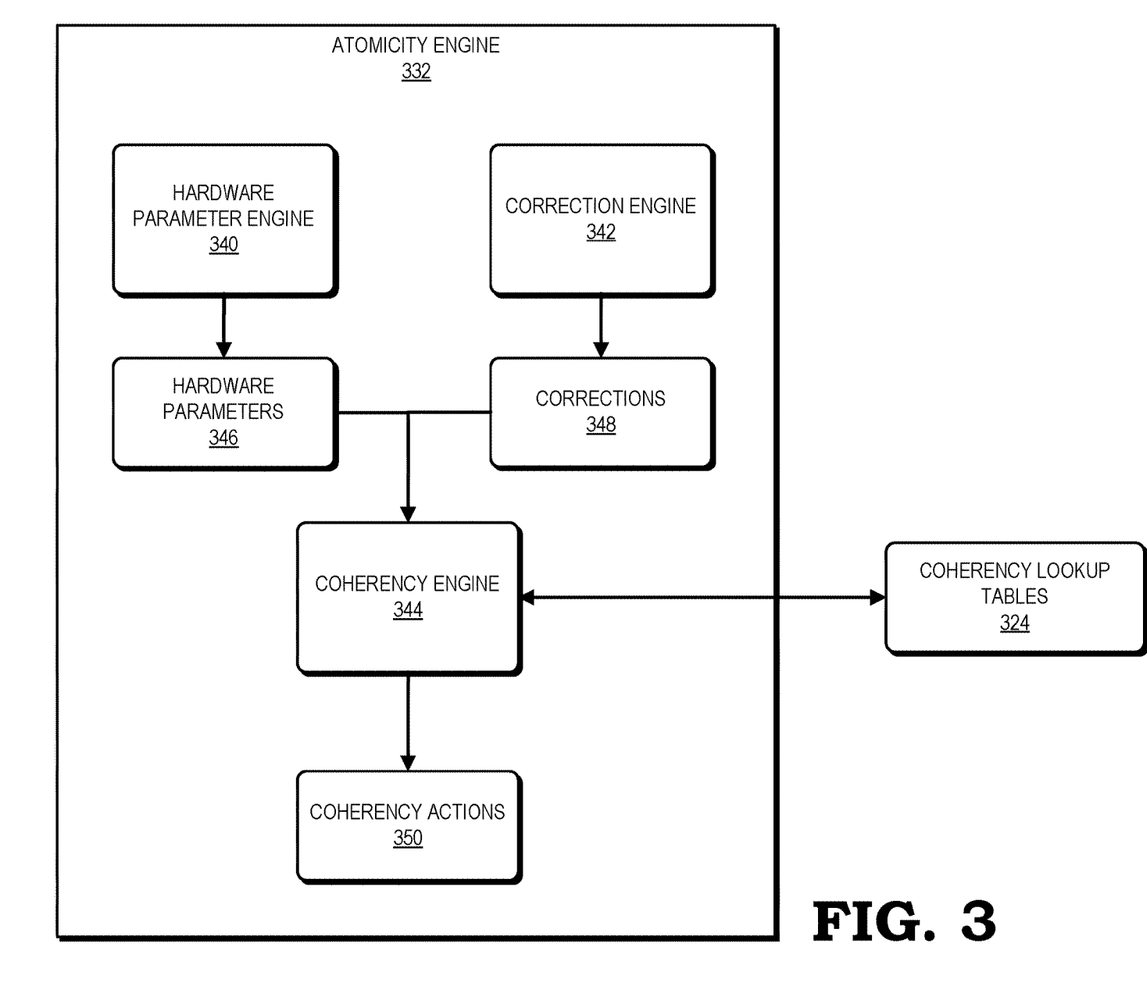
FIG. 3 is a block diagram of an atomicity engine configured to generate one or more coherency actions, in accordance with some embodiments.

Referring now to FIG. 3, a block diagram of an atomicity engine 332, similar to or the same as atomicity engine 232, configured to determine one or more coherency actions is presented. Atomicity engine 332 includes hardware and software configured to, in response to one or more atomic memory operations to be performed, determine one or more coherency actions 350. In embodiments, atomicity engine 332 includes hardware parameter engine 340 including hardware and software configured to determine one or more hardware parameters 346 based on an atomic memory operation to be performed. For example, hardware parameter engine 340 determines one or more hardware parameters 346 based on one or more portions of a system, devices, memories, memory hierarchies, or any combination thereof identified in a scope of an atomic memory operation. Such hardware parameters 346 include one or more parameters necessary for, aiding in, or assisting in ensuring coherency within the scope identified by an atomic memory operation to be performed, for example, operating modes (e.g., performance mode, power-saving mode, two-core mode, four-core mode, split mode, thread mode), addresses, connectivity (e.g., how devices are connected, number of ports, available ports, communication protocols), device architecture (e.g., number of cores), device hierarchies, memory locations, and memory architectures of the portions of a system, devices, memories, memory hierarchies, or any combination thereof identified in a scope of an atomic memory operation, to name a few. According to embodiments, hardware parameter engine 340 is configured to determine hardware parameters 346 by performing one or more discovery operations requesting data from the portions of a system, devices, memories, memory hierarchies, or any combination thereof identified in a scope of an atomic memory operation. In embodiments, hardware parameter engine 340 is configured to retrieve hardware parameters relating to the portions of a system, devices, memories, memory hierarchies, or any combination thereof identified in a scope of an atomic memory operation from a memory similar to or the same as memory 106. In embodiments, one or more hardware parameters may be stored in a memory similar to or the same as memory 106 by one or more other processing devices connected to the processing device. For example, one or more other processing devices execute a software driver configured to identify one or more hardware parameters and store them in the memory.

According to embodiments, atomicity engine 332 includes correction engine 342 that includes hardware and software configured to determine one or more corrections 348 based on atomic memory operations to be performed and hardware parameters 346. For example, correction engine 342 compares a scope identified in an atomic memory operation, a target data identified in an atomic memory operation, and hardware parameters 346 to determine one or more discrepancies or incongruencies. As an example, based on a comparison of a scope indicating a level of a memory cache and a hardware parameter indicating that level is not accessible, correction engine 342 determines a discrepancy. As another example, based on a comparison of a scope indicating a memory cache local to a device and a hardware parameter indicating that the memory is connected to the device by a bus, correction engine 342 determines a discrepancy. In response to determining a discrepancy or incongruency, correction engine 342 determines one or more corrections 348. Corrections 348 include updated parameters, modifications, or inputs necessary for, assisting in, or aiding in the mitigation of the impact the identified discrepancies and incongruencies may have on the coherency of the atomic memory operation. For example, corrections 348 include updating one or more scopes, target data, or hardware parameters 346 to mitigate any impact the identified discrepancies and incongruencies have on the coherency of the atomic memory operation. As an example, corrections 348 include updating one or more scopes or target data to reflect the most recent data in hardware parameters 346. As another example, corrections 348 include updating hardware parameters 346 at runtime. In embodiments, corrections 348 include updating one or more scope, target data, or hardware parameters 346 to mitigate any impact an atomic memory operation to be performed has on system performance. That is to say, the impact on one or more processing speeds, power usages, delay times, queue lengths, or any combination thereof of system 100, to name a few. For example, correction engine 342 determines a power usage based on a hardware parameter and an atomic memory operation to be performed. Correction engine 342 then identifies a correction comprising a modification to a coherency action based on the power usage and modifies the coherency action based on the correction.

In embodiments, atomicity engine 332 includes coherency engine 344 that includes hardware and software configured to receive hardware parameters 346 and corrections 348 and output one or more coherency actions 350. According to embodiments, coherency engine 344 is configured to perform one or more corrections 348 on scopes identified in atomic memory operations, target data identified in atomic memory operations, or hardware parameters 346. For example, coherency engine 344 updates one or more scopes, target data, or hardware parameters 346 based on one or more corrections 348. In embodiments, coherency engine 344 provides one or more scopes identified in atomic memory operations, target data identified in atomic memory operations, hardware parameters 346, and corrections 348 to coherency LUTs 324, similar to or the same as coherency LUTs 224. Coherency LUTs 324 include hardware LUTs configured to receive one or more scopes, target data, hardware parameters 346, corrections 348, or any combination thereof and output one or more values indicating one or more coherency actions 350. For example, in response to receiving one or more scopes, target data, hardware parameters 346, corrections 348, or any combination thereof as an input, coherency LUTs 324 output one or more values each respectively indicating, for example, updating state machines, flushing one or more memory structures (e.g., caches, data fabrics), invalidating one or more memory structures, bypassing one or more memory structures, fencing one or more memory structures, and fencing one or more threads, to name a few. According to embodiments, coherency LUTs 324 are further configured to receive one or more scopes, target data, hardware parameters 346, corrections 348, or any combination thereof and output a value indicating one or more orderings for portions of one or more coherency actions and portions of atomic memory operations. That is to say, an ordering indicating what order the portions of the coherency actions and the atomic memory operations are to be performed or executed. In embodiments, coherency engine 344 is configured to determine the one or more coherency actions 350 indicated based on the output values of the coherency LUTs. In embodiments, coherency engine 344 is configured to determine machine instructions, state machine data, or both associated with coherency actions 350 and retrieve the determined machine instructions, state machine data, or both from a memory similar to or the same as memory 106. According to embodiments, coherency engine 344 provides the determined machine instructions, state machine data, or both associated with coherency actions 350 to microcode configured to translate the determined machine instructions and state machine data into one or more circuit-level operations. Coherency engine 344 then provides the circuit-level operations to one or more processing devices for execution.

Figure 4:
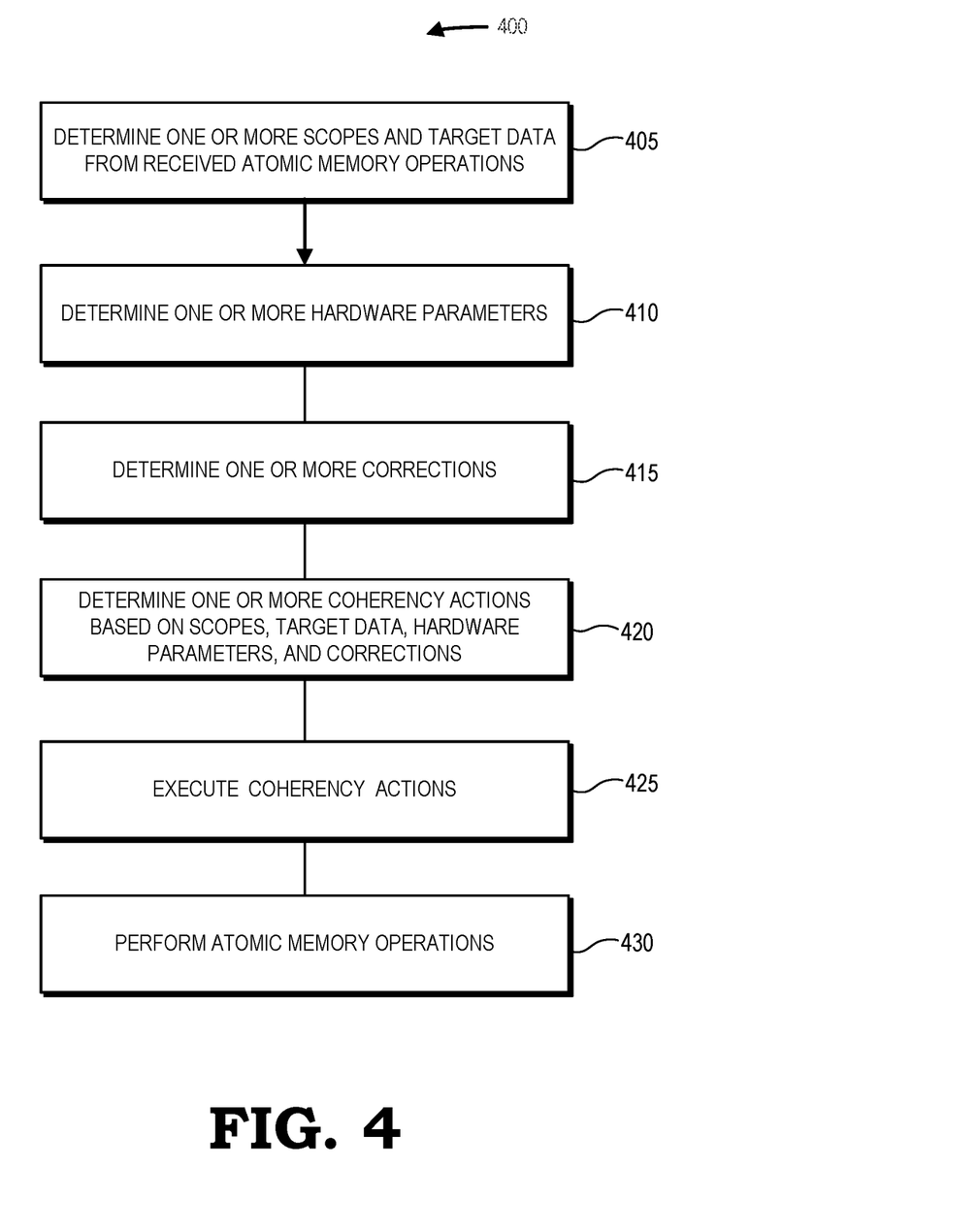
FIG. 4 is a flow diagram illustrating a method for performing a hardware-agnostic atomic memory operation, in accordance with some embodiments.

Referring now to FIG. 4, a flow diagram illustrating an example method 400. for performing a hardware-agnostic atomic memory operation is presented. At step 405, a processing device, similar to or the same as processing device 200, causes one or more atomic memory operations to be performed each identifying a scope and a target data. Based on the atomic memory operations to be performed, the processing device determines one or more scopes and target data for coherency. At step 410, the processing device determines one or more hardware parameters based on the atomic memory operations to be performed. That is to say, the processing device determines the hardware parameters based on the determined scopes identified by the atomic memory operations to be performed. In embodiments, the processing device determines the hardware parameters according to the portions of a system, devices, memories, memory hierarchies, or any combination thereof identified in the scopes of the atomic memory operations to be performed. For example, the processing device can retrieve the hardware parameters associated with the portions of a system, devices, memories, memory hierarchies, or any combination thereof identified in the atomic memory operations to be performed from a memory similar to or the same as memory 106, perform one or more discover operations to determine the hardware parameters associated with the portions of a system, devices, memories, memory hierarchies, or any combination thereof identified in the atomic memory operations to be performed or both.

At step 415, in response to determining one or more hardware parameters, the processing device determines one or more corrections. According to embodiments, the processing device compares one or more scopes identified in atomic memory operations to be performed, target data identified in atomic memory operations, determined hardware parameters, or any combination thereof. Based on the comparisons, the processing device determines one or more discrepancies or incongruencies between the scopes identified in atomic memory operations to be performed, target data identified in atomic memory operations, and determined hardware parameters. From the discrepancies or incongruencies, the processing device determines one or more corrections. That is to say, the processing device determines one or more updated parameters, modifications, or inputs necessary for, assisting in, or aiding in the mitigation of the impact the identified discrepancies and incongruencies may have on the coherency of the atomic memory operation. For example, the processing device determines one or more corrections that include updating one or more scopes, target data, or hardware parameters to mitigate the impact the identified discrepancies and incongruencies have on the coherency of an atomic memory operation to be performed. By determining one or more corrections based on the determined discrepancies and incongruencies, the processing device can update the inputs at run time. This allows the processing device to determine more efficient coherency actions and increases overall processor efficiency.

At step 420, the processing device determines one or more coherency actions based on the determined scopes, target data, hardware parameters, and corrections. For example, the processing device provides one or more scopes, target data, hardware parameters, corrections, or any combination thereof to one or more hardware LUTs, similar to or the same as coherency LUTs 224, as inputs. In response to receiving the scopes, target data, hardware parameters, and corrections, the LUTs output values indicating one or more coherency operations. That is to say, the LUTs output values indicating one or more operations necessary for, assisting in, or aiding in ensuring that the atomic memory operations to be performed are coherent within the scope identified by the atomic memory operations. Such operations include, for example, updating state machines, flushing one or more memory structures (e.g., caches, data fabrics), invalidating one or more memory structures, bypassing one or more memory structures, fencing one or more memory structures, and fencing one or more threads, to name a few. In embodiments, one or more LUTs output one or more values indicating one or more orderings for portions of coherency actions and atomic memory operations based on one or more received scopes, target data, hardware parameters, and corrections. That is to say, the LUTs output values indicating the order in which portions of coherency actions and atomic memory operations are to be performed. At step 425, the processing device executes one or more coherency actions indicated by the outputs of the LUTs and according to one or more orderings. For example, the processing device can retrieve machine instructions, state machine data, or both associated with the indicated coherency actions, provide machine instructions, state machine data, or both associated with the indicated coherency actions to microcode configured to translate the determined machine instructions and state machine data into one or more circuit-level operations, or both. At step 430, based on one or more orderings indicated by the LUTs, the processing device performs one or more of the atomic memory operations to be performed. In this way, the operations to help ensure atomicity of the atomic memory operations are determined at the hardware allowing the atomic memory operations to be device-agnostic.

In some embodiments, the apparatus and techniques described above are implemented in a system including one or more integrated circuit (IC) devices (also referred to as integrated circuit packages or microchips), such as the system described above with reference to FIGS. 1-4. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to identifying an atomic memory operation to be performed at a core of a processor, determining, at the core of the processor, a hardware parameter based on a scope indicated in the atomic memory operation to be performed;
   identifying a coherency action based on the hardware parameter and the scope; and
   in response to identifying the coherency action, performing at least a portion of the atomic memory operation at the core of the processor.

2. The method of claim 1, wherein identifying the coherency action based on the hardware parameter and the scope further comprises:
   providing data representing the scope and the hardware parameter to a plurality of lookup tables configured to output a value indicating the coherency action in response to receiving the scope and the hardware parameter.

3. The method of claim 2, wherein the plurality of lookup tables is further configured to output a value indicating an ordering for at least a portion of the coherency action and at least a portion of the atomic memory operating.

4. The method of claim 3, further comprising:
   performing at least a portion of the coherency action and at least a portion of the atomic memory operation based on the ordering.

5. The method of claim 1, further comprising:
   comparing the scope to the hardware parameter; and
   determining a correction based on the comparison of the scope to the hardware parameter,
   wherein the coherency action is identified further based on the correction.

6. The method of claim 1, wherein the at least a portion of the coherency action includes a flush or invalidate operation on a cache.

7. The method of claim 1, further comprising:
   translating state machine data associated with the coherency action into a circuit-level operation; and
   executing at least a portion of the coherency action, wherein executing at least a portion of the coherency action includes executing the circuit-level operation.

8. An apparatus comprising:
   a cache; and
   a processing device connected to the cache and configured to:
      identify, at a core of the processing device, an atomic memory operation to be performed indicating a scope and a target data;
      determine, at the core, a plurality of hardware parameters based on the scope and the target data;
      identify a coherency action based on the scope, target data, and plurality of hardware parameters;
      execute at least a portion of the coherency action; and
      perform the atomic memory operation.

9. The apparatus of claim 8, wherein at least a portion of the coherency action includes a flush operation of the cache.

10. The apparatus of claim 8, wherein at least a portion of the coherency action includes a bypass of the cache.

11. The apparatus of claim 8, wherein the processing device is further configured to:
    determine the plurality of hardware parameters further based on the cache and based on a bus connecting the cache and the processing device.

12. The apparatus of claim 8, wherein the plurality of hardware parameters includes an operating mode of a second processing device connected to the bus.

13. The apparatus of claim 8, further comprising:
    a plurality of hardware lookup tables configured to:
       receive the scope, target data, and plurality of hardware parameters as inputs; and
       output a value indicating the coherency action and an ordering of the at least a portion of the coherency action and the at least a portion of the atomic memory operation.

14. The apparatus of claim 8, wherein the processing device is further configured to:
    determine a power usage based on one or more hardware parameters and the atomic memory operation to be performed;
    identify a correction based on the determined power usage; and
    modify at least a portion of the coherency action based on the correction.

15. The apparatus of claim 14, wherein the processing device is configured to determine the correction at a runtime of the processing device.

16. The apparatus of claim 14, wherein the processing device is further configured to:
    update the scope based on the correction.

17. A method comprising:
    identifying, at a first processing device connected to a second processing device, an atomic memory operation to be performed;
    determining a plurality of hardware parameters based on the first processing device, second processing device, and atomic memory operation;
    identifying a coherency action and an ordering for at least a portion of the coherency action and at least a portion of the atomic memory operation based on the plurality of hardware parameters and the atomic memory operation; and executing at least a portion of the coherency action and at least a portion of the atomic memory operation based on the ordering.

18. The method of claim 17, wherein the plurality of hardware parameters is further determined based on a bus connecting the first and second processing devices.

19. The method of claim 17, wherein the plurality of hardware parameters includes an operating mode of the first processing device.

20. The method of claim 17, wherein the plurality of hardware parameters includes an operating mode of the second processing device.

* * * * *